Aug. 3, 1926.
W. W. GRAY
1,594,903
METHOD OF MAKING PISTON RINGS AND APPARATUS THEREFOR
Filed April 29, 1925      3 Sheets-Sheet 1
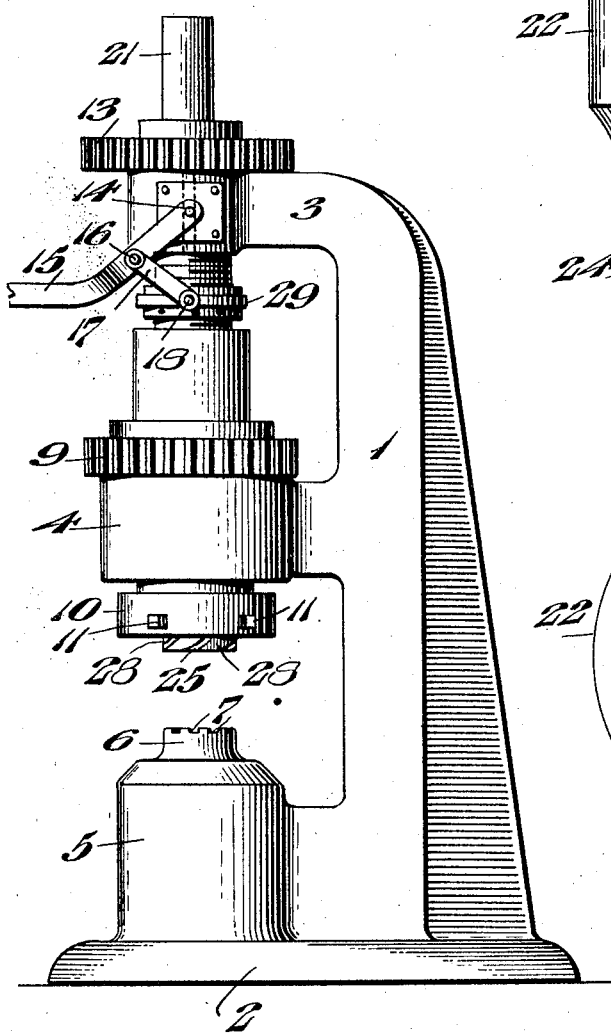
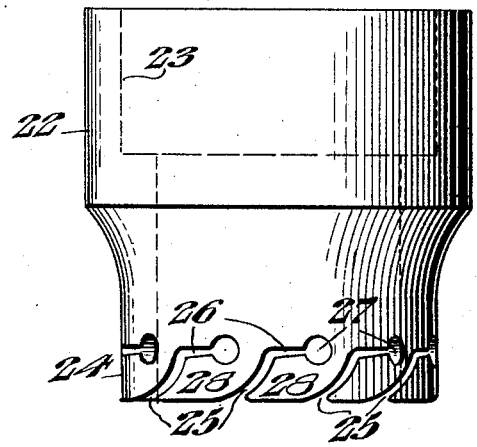
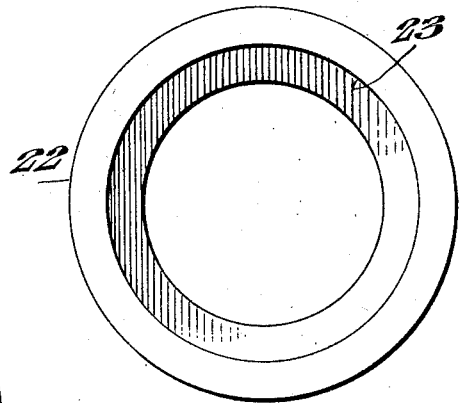
INVENTOR:
Walter W. Gray
BY
ATTORNEYS Aug. 3, 1926.

W. W. GRAY 1,594,903

METHOD OF MAKING PISTON RINGS AND APPARATUS THEREFOR

Filed April 29, 1925     3 Sheets-Sheet 2

INVENTOR:
Walter W. Gray,
BY
ATTORNEYS.

Aug. 3, 1926. 1,594,903
W. W. GRAY
METHOD OF MAKING PISTON RINGS AND APPARATUS THEREFOR
Filed April 29, 1925   3 Sheets-Sheet 3

INVENTOR:
Walter W. Gray,
BY
ATTORNEYS.

Patented Aug. 3, 1926.

1,594,903

UNITED STATES PATENT OFFICE.

WALTER W. GRAY, OF PHILADELPHIA, PENNSYLVANIA.

METHOD OF MAKING PISTON RINGS AND APPARATUS THEREFOR.

Application filed April 29, 1925. Serial No. 26,597.

My invention relates to a novel method of making piston rings, whereby both the inner and outer peripheral surfaces of piston rings may be turned, or otherwise surfaced, with but a single mounting of the same; whereby a series, or a batch of such rings, may be so turned, or otherwise surfaced, on their peripheral surfaces with a single mounting of such series of rings in a a stack; and whereby, moveover the operation of turning, or otherwise surfacing, the inner and outer peripheral surfaces of piston rings is greatly facilitated and the cost thereof reduced.

With the above ends in view, my invention contemplates a novel method of making piston rings, which consists in turning, or otherwise surfacing, the opposed edges of the rings so as to produce to parallel and plane edge surfaces, rigidly clamping a series of such plane edged rings in a stack, in substantial alignment with each other, turning or otherwise surfacing the inner peripheral surfaces of said series of rings by passing through said stack of rings a suitable revolving turning tool or boring tool, and turning or otherwise surfacing, the outer peripheral surfaces of said series of rings, by causing a suitable turning tool to revolve about the stack of rings and to travel longitudinally thereof while the stack of rings is clamped rigidly, and without releasing or remounting the stack of rings for either one or the other of said two turning operations.

My invention contemplates, more particularly, the method of making piston rings which consists in turning the edges of rings to plane parallel surfaces, clamping a stack of such parallel edged rings rigidly and boring or turning the inner peripheral surface of said stack of rings and turning or otherwise surfacing the outer peripheral surface of said stack of rings simultaneously and in opposite directions, whereby the operations of surfacing or turning the inner and outer peripheral surfaces of piston rings is greatly facilitated and the handling of the rings is reduced to a minimum by such simultaneous inner and outer turning operations and whereby the clamping of the stack of rings is augmented by the turning of the outer and inner surfaces of said rings simultaneously and in opposite directions, so that the torques produced by the inner and outer cutting operations upon the stack of rings neutralize each other.

My invention further relates to a novel apparatus for making piston rings by my novel method, comprising a pair of suitable coaxial spindles, inner and outer surfacing tools carried by said two spindles respectively, means to feed said spindles longitudinally of the axis thereof, means to revolve said pair of spindles in opposite directions, a movable clamping plunger adapted for axial movement, disposed coaxially with respect to said pair of spindles and having a clamping head at one end thereof in operative alignment with said pair of coaxially disposed spindles and a stationary clamping head in juxtaposition to said movable clamping head and adapted to coact therewith, rigidly to clamp a stack of superimposed parallel edged piston rings between said two heads and in a position coaxially disposed with respect to said pair of spindles so that the inner and outer surfaces of said clamped stack of rings will be in operative alignment with the inner and outer turning or surfacing tools carried by said two coaxial spindles respectively.

For the purpose of illustrating my invention, I have shown in the accompanying drawings forms thereof, which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

In the accompanying drawings,

Figure 1 represents in side elevation, the general arrangement of the apparatus embodying my invention.

Figure 3 represents a view in side elevation, on an enlarged scale, of the movable resilient clamping head shown in Figures 1 and 2.

Figure 4 represents a top plan view of the same.

Figure 2:
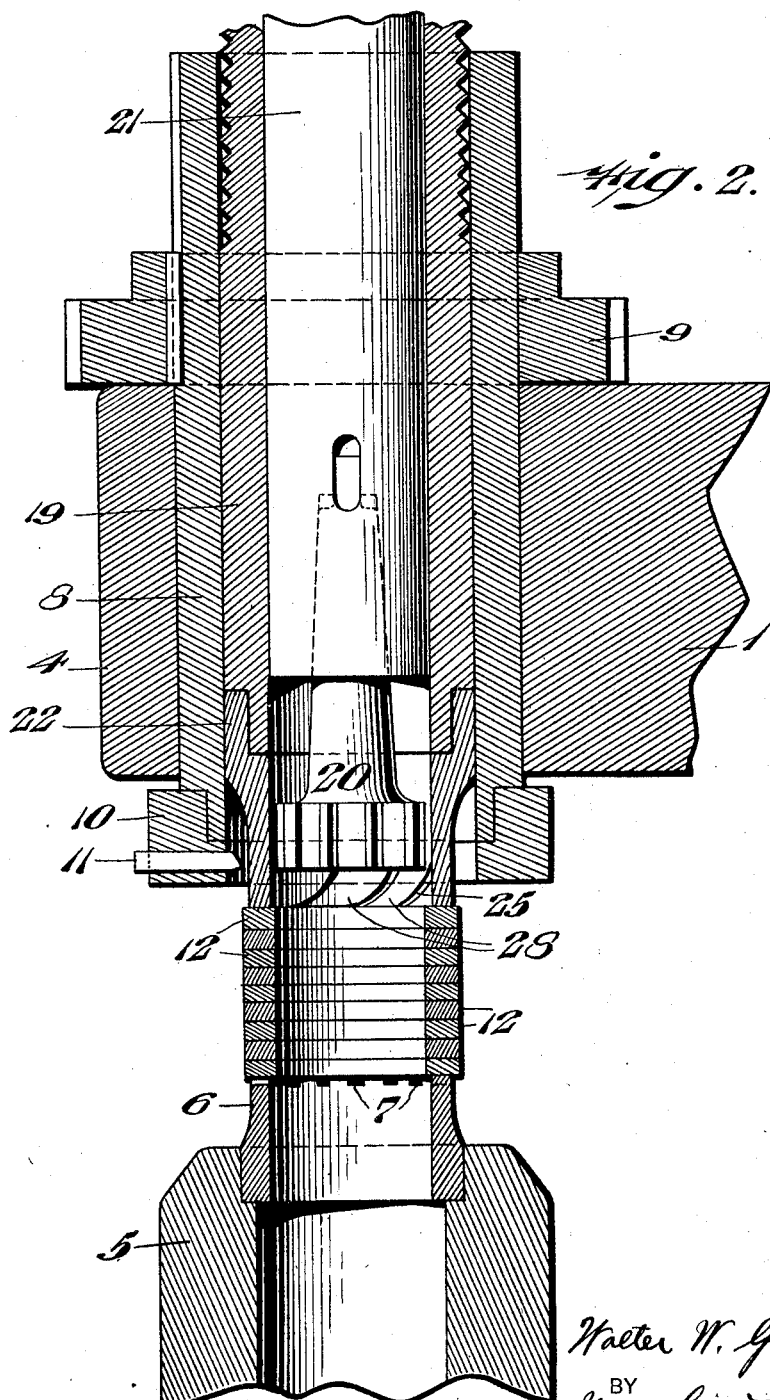
Figure 2 represents a vertical section. on an enlarged scale of the general arrangement of the pair of coaxial spindles, the coaxial clamping plunger, the movable clamping head carried thereby and the stationary clamping head, embodying my invention.

Referring to the drawings, in which like reference characters indicate like parts, 1 designates an upright frame or housing for supporting the various operative elements, of my novel device, having the base 2, the upper spindle bracket 3 extending laterally therefrom and formed integral therewith and the lower spindle bracket 4, also extending laterally from said frame 1 and formed integral therewith and in alignment with the upper spindle bracket 3. The base 2 also carries an upright block 5 upon which the piston rings are to be mounted, which block in turn carries the stationary annular clamping edge, serrated as at 7. The stationary clamping head 6 is also positioned in direct vertical alignment below the spindle brackets 3 and 4.

Referring to Figures 1 and 2 particularly, in which, the general arrangement of the spindles is shown, 8 designates an outer, hollow, tubular spindle journalled in the lower spindle bracket 4 and adapted for an axial vertical feeding movement or travel. The manner of accomplishing the latter is brought out more in detail hereinbefore with reference to Figure 5 hereof. A gear 9, suitably keyed to the spindle 8, is adapted to mesh with any suitable driving mechanism, thereby to impart the desired rotary motion to the spindle 8 for the desired turning operation. To the lower end of the spindle 8 is secured a cutter head or support 10, carrying one or several suitable radially disposed cutters 11 suitably secured therein and adjusted to the desired outer circumference of the piston rings 12, by any suitable means, not shown in detail in the drawings.

The hollow tubular clamping plunger 19 is mounted in the spindle 8 and extends therethrough, to the lower end of the spindle 8 is rigidly secured the movable clamping head 22, of an annular shape of substantially the same inner and outer diameters as the stationary lower clamping head 6. In the accompanying drawings, a toggle mechanism is shown for actuating the clamping plunger 19 and thereby to clamp between the stationary lower clamping head and the upper movable clamping head 22, a stack of piston rings 12, as shown in Figure 2, although any other suitable pressure producing device or mechanism may be employed. Thus, the upper portion of the plunger 19, is threaded and carries an adjustable thrust collar 29, threadedly secured thereto, which thrust collar carries a pair of opposed laterally projecting trunnions 18. An actuating lever 15 is provided with a forked end which straddles the upper spindle bracket 3 and has the terminals of its limbs pivoted to said spindle bracket 3 on the pivots 14. Corresponding limbs 17, pivotally secured at their respective ends on the trunnions 18 and the pivots 16 carried by the forked portion of the lever 15, complete the toggle between the pivots 14 and the trunnions 18. By lowering the lever 15 the clamping plunger 19 is lowered and by distending the toggle to a point beyond the dead center of the same, the plunger 19 may be locked in its lowermost position, with sufficient pressure exerted by the toggle, rigidly to clamp the stack of rings 12 between the stationary clamping head 6 and the movable clamping head 22. An inner spindle 21 is rotatably mounted within the clamping plunger 19 and also at its upper end by the upper spindle bracket 3, extends therethrough and is adapted for axial displacement or travel. The inner spindle 21 is also provided with a suitable gear 13 keyed thereto, and adapted to mesh with any suitable driving mechanism, so as to impart rotary motion to said spindle 21. The lower end of the spindle 21 carries a suitable internal turning, surfacing or boring devices, such as the tapered, boring tool 20 having a diameter equal to the desired inner diameter of the rings and extending through the annular movable clamping head 22.

In order to allow and compensate for any slight irregularities in the thicknesses of the rings 12 or any slight deviations from the two plane parallel surfaces of the edges thereof. One of the two clamping heads 6 and 22 preferably the upper movable clamping head 22, is provided with a resilient or yieldable clamping edge, made by providing suitable inclined slots 25 in the annular wall of said head 22, which continue in the horizontal slots 26 and which in turn terminate in the slightly enlarged apertures 27 thereby producing a series of resilient jaws 24, throughout the periphery of said clamping head.

Thus, in order to turn a series of piston rings 12 to the desired inner and outer diameters without two corresponding mountings, it is merely necessary to turn or otherwise surface the edges of the rings to parallel planes, then rigidly to clamp a series of said parallel edged rings superimposed upon each other in a stack and in substantial alignment with each other between the stationary clamping head 6 and the movable clamping head 22 carried by the hollow clamping plunger 19 and then to pass corresponding inner and outer rotary turning or other surfacing tools along the inner and the outer peripheral surfaces respectively of said clamped stack of rings and preferably simultaneously and in opposite rotary directions.

Figure 5:
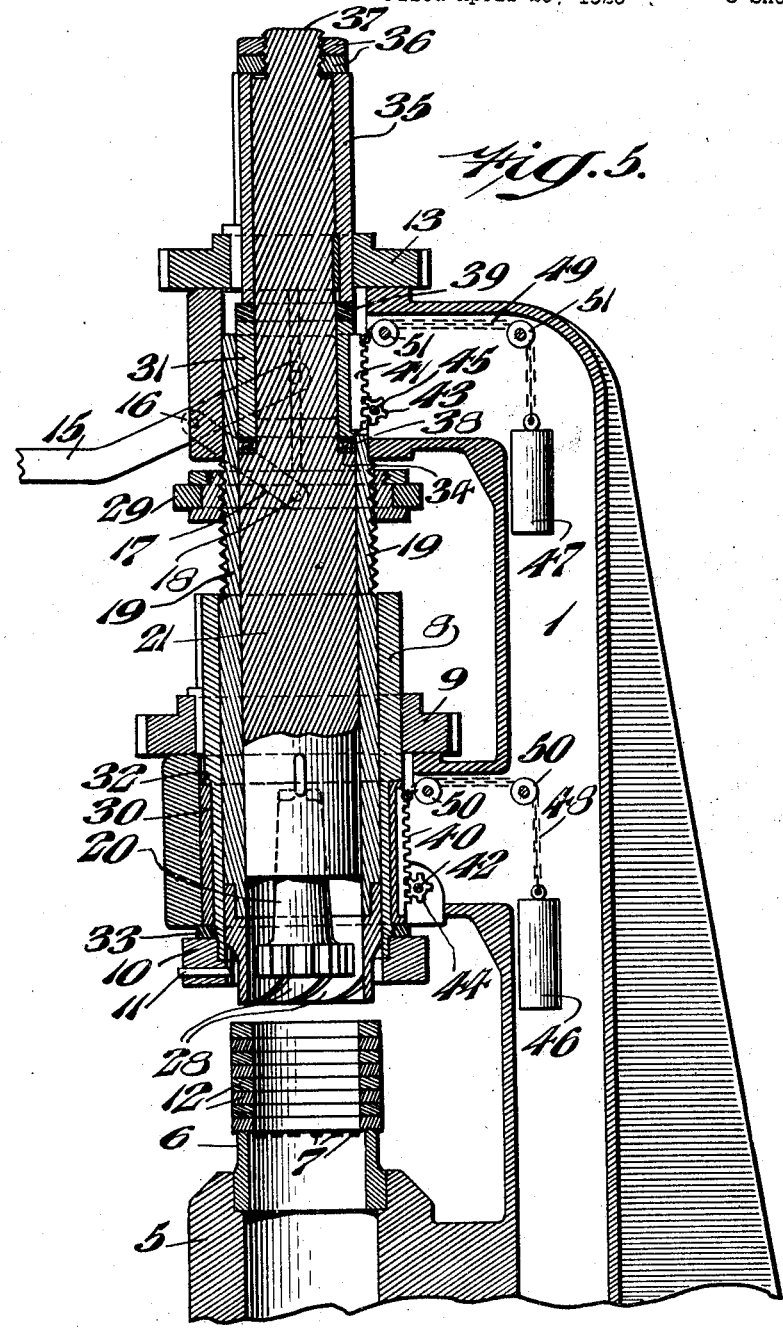
Figure 5 represents a section, similar to that shown in Figure 2, illustrating the manner in which the inner and outer rotary spindles may be supported or suspended, and raised and lowered at will, and the manner in which rotary motion may be imparted to the same.

Figure 5 is a more detail sectional view, similar to that shown in Figure 2, illustrating the manner in which the inner spindle 21 and the outer spindle 8 may be supported or suspended, and the manner in which the same may be raised or lowered at will. Thus, each of the spindles 8 and 21, is surrounded by a thrust collar or sleeve 30 and 31 respectively, which do not revolve and which engage the respective spindles in a vertical longitudinal direction. Thus, the thrust sleeve or collar 30 is interposed between a suitable shoulder 32 on the spindle 8 and the end ring 33 which is secured to the lower end of said spindle 8. The upper thrust sleeve or collar 31 is interposed between the shoulder 34 and the sleeve 35, which is maintained fixedly by the nuts 36 threaded on the end 37 of said inner spindle 21. Suitable thrust ball bearings 38 and 39 may be interposed between the thrust sleeve or collar 31 and the spindle 21 in order to reduce friction. The lower thrust sleeve or collar 30 carries a rack 40 rigidly secured thereto, while the upper thrust sleeve or collar 31 carries a similar rack 41 also rigidly secured thereto. A suitable slot may be provided in the clamping plunger 19, through which the rack 41 may extend. The pinions 42 and 43 are in mesh with the respective racks 40 and 41 and are carried by corresponding shafts 44 and 45, which are journalled in the housing 1 of the machine and extend outwardly. Suitable handles or actuating means, not shown in the drawing is carried by each of the shafts 44 and 45, whereby the pinions 42 and 43 may be actuated, thereby to raise and lower the inner and outer spindles 8 and 21, at will.

The spindles 8 and 21 may be counterbalanced or "floated" by means of the counterweights 46 and 47, carried by the chains 48 and 49, respectively, which pass over pulleys 50 and 51 and have their ends secured to the racks 40 and 41 respectively, or to the corresponding thrust collars 30 and 31.

In the accompanying drawings, the actuating mechanisms have been omitted purposely. It is to be understood that any suitable mechanism may be employed to impart the desired rotary motion to the two spindles 8 and 21, as brought out hereinbefore, and similarly, any suitable power driven mechanism may be also employed for raising and lowering the spindles 8 and 21 automatically.

It will now be apparent that I have devised a new and useful method of making piston rings and apparatus therefor, which embodies the features of advantage enumerated as desirable in the statement of the invention and the above description, and while I have in the present instance shown and described preferred embodiments thereof which will give in practice satisfactory and reliable results, it is to be understood that such embodiment is susceptible of modification in various particulars without departing from the spirit or scope of the invention or sacrificing any of its advantages.

What I claim is:

1. The method of making rings, which consists in surfacing the opposed edges of the rings to parallel planes, rigidly clamping a series of the rings thus surfaced on their edges, in a stack by an end thrust exerted on the two terminal rings, with the parallel edges thereof abutting each other, and lastly turning the inner and outer peripheral surfaces of said rings while thus clamped in a stack, without remounting.

2. The method of making rings which consists in surfacing the opposed edges of rings to parallel planes, rigidly securing a series of such parallel edged rings in a stack with the edges thereof abutting each other by an end thrust exerted on the two terminal rings, and lastly surfacing the inner and outer peripheral edges of said rings simultaneously.

3. The method of making rings which consists in surfacing the opposed edges or rings to parallel planes, rigidly securing a series of such parallel edged rings in a stack with the edges thereof abutting each other by an end thrust exerted on the two terminal rings, and lastly surfacing the inner and outer peripheral edges of said rings, simultaneously and in opposite directions.

4. The method of making rings which consists in turning the opposed edges of rings to parallel planes, rigidly securing a series of such parallel edged rings in a stack with the edges thereof abutting each other by an end thrust exerted on the two terminal rings, and lastly turning the inner and outer peripheral edges of said rings simultaneously.

5. The method of making rings which consists in turning the opposed edges of rings to parallel planes, rigidly securing a series of such parallel edged rings in a stack with the edges thereof abutting each other by an end thrust exerted on the two terminal rings, and lastly turning the inner and outer peripheral edges of said rings simultaneously and in opposite directions.

6. In a ring turning machine, an outer axially movable and rotatable hollow tubular spindle, a coaxially disposed hollow tubular clamping plunger within said outer spindle, an inner coaxially disposed and axially movable and rotatable inner spindle within said clamping plunger a stationary clamping head in axial alignment with said clamping plunger and spaced from one end thereof, and outer and inner cutters carried by said outer and inner spindles respectively.

7. In a ring turning machine, an outer axially movable and rotatable spindle, a coaxially disposed and axially movable and rotatable inner spindle, a coaxially disposed and axially movable clamping plunger intermediate said inner and outer spindles, outer and inner cutters carried by said outer and inner spindles respectively, a stationary clamping head in operative alignment with said clamping plunger and adapted to cooperate therewith to clamp therebetween a stack of piston rings in operative alignment with said inner and outer cutters respectively.

8. In a ring turning machine, a hollow rotatable and axially movable spindle, a coaxially disposed stationary clamping head, a hollow clamping plungere extending through said spindle, a movable clamping head carried by an end thereof, in juxtaposition to and in operative alignment with said stationary clamping head and coaxially disposed with respect to said outer spindle; said hollow clamping plunger being fixed against rotation.

9. In a ring turning machine, an outer axially movable and rotatable hollow tubular spindle, a coaxially disposed and axially movable hollow tubular clamping plunger within said outer spindle fixed against rotation, a coaxially disposed and axially movable and rotatable inner spindle within said clamping plunger and means to rotate said two spindles simultaneously.

10. In a ring turning machine, an outer axially movable and rotatable hollow tubular spindle, a coaxially disposed and axially movable hollow tubular clamping plunger within said outer spindle, a coaxially disposed and axially movable and rotatable inner spindle within said clamping plunger, and means to rotate said two spindles simultaneously and in opposite directions.

11. In a ring turning machine, an outer axially movable and rotatable hollow tubular spindle, a coaxially disposed and axially movable hollow tubular clamping plunger within said outer spindle, a coaxially disposed and axially movable and rotatable inner spindle within said clamping plunger and means to displace said inner and outer spindles axially.

12. In a ring turning machine, an outer axially movable and rotatable hollow tubular spindle, a coaxially disposed hollow tubular clamping plunger within said outer spindle, a coaxially disposed and axially movable and rotatable inner spindle within said clamping plunger, means to displace said inner and outer spindles axially and means to rotate said inner and outer spindles simultaneously and in opposite directions.

13. In a ring turning machine, a pair of coaxially disposed spindles, external and internal turning devices carried by the two spindles respectively, a coaxially disposed clamping plunger, a movable clamping head carried by said clamping plunger and a stationary clamping head in operative alignment with said movable clamping head; one of said clamping heads having a resilient clamping edge.

14. In a ring turning machine, a pair of coaxially disposed spindles, internal and external cutting devices carried by said two spindles respectively, a coaxially disposed clamping plunger, a resilient movable clamping head carried by said clamping plunger, and a non-resilient stationary clamping head in operative alignment with said movable clamping head.

15. In a ring turning machine, a pair of coaxially disposed spindles, external and internal turning devices carried by the two spindles respectively, a coaxially disposed clamping plunger, a movable clamping head carired by said clamping plunger, a stationary clamping head in operative alignment with said movable clamping head; one of said clamping heads being provided with a resilient clamping edge, and means to urge said plunger towards said stationary clamping head and to maintain the same with sufficient force rigidly to secure between said two clamping heads a stack of piston rings, in operative alignment with said internal and external turning devices.

16. A device of the character stated comprising in combination a base part having a serrated portion adapted to receive a plurality of piston rings, a compensating shaft or sleeve for neutralizing unparallelism in said piston rings, means for vertical reciprocation of said shaft or sleeve, a pair of rotatable vertical spindles between which said shaft or sleeve operates upon said piston rings for internal and external machining of said piston rings, and means including apparatus of high leverage for actuating said shaft or sleeve.

In testimony whereof, I have hereunto signed my name.

WALTER W. GRAY.